US012681876B2

(12) United States Patent
Sancon

(10) Patent No.: US 12,681,876 B2
(45) Date of Patent: Jul. 14, 2026

(54) TOPOLOGY-BASED DYNAMIC ADDRESS ASSIGNMENT OF SEMICONDUCTOR MEMORY DEVICES

(71) Applicant: Micron Technology, Inc., Boise, ID (US)

(72) Inventor: John Christopher M. Sancon, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/744,427

(22) Filed: Jun. 14, 2024

(65) Prior Publication Data

US 2025/0021499 A1     Jan. 16, 2025

Related U.S. Application Data

(60) Provisional application No. 63/525,898, filed on Jul. 10, 2023.

(51) Int. Cl.
| *G06F 13/16* | (2006.01) |
| *G06F 13/40* | (2006.01) |
| *G06F 13/42* | (2006.01) |

(52) U.S. Cl.
CPC ...... *G06F 13/1694* (2013.01); *G06F 13/4068* (2013.01); *G06F 13/4282* (2013.01)

(58) Field of Classification Search
CPC ..................................................... G06F 9/505
See application file for complete search history.

(56) References Cited

U.S. PATENT DOCUMENTS

| 7,164,694 | B1 * | 1/2007 | Nodoushani | ........ H04L 12/2856 |
| | | | | 370/467 |
| 2004/0213067 | A1 | 10/2004 | Best et al. | |
| 2015/0378814 | A1 * | 12/2015 | Webb | ...................... G06F 3/061 |
| | | | | 714/768 |

FOREIGN PATENT DOCUMENTS

| EP | 1628225 A2 | 2/2006 |
| EP | 2549481 A2 | 1/2013 |

OTHER PUBLICATIONS

Huang, Sally. "Introduction to MIPI 13C" NXP, pp. 1-39, Nov. 2022. [retrieved from: <URL: https://www.nxp.com/docs/en/training-reference-material/TIP-1109-MIPI_13C-CN-1.pdf> [pp. 25, 27-30, 32].

International Application No. PCT/US2024/033901—International Search Report and Written Opinion, mailed Oct. 10, 2024, 9 pages.

* cited by examiner

*Primary Examiner* — Henry Tsai
*Assistant Examiner* — Juanito C Borromeo
(74) *Attorney, Agent, or Firm* — Dorsey & Whitney LLP

(57) ABSTRACT

Disclosed are methods, systems, and apparatuses for a topology-based dynamic address assignment (DAA) of semiconductor memory devices (e.g., dynamic random access memory (DRAM)). The memory devices may be connected via a daisy chain arrangement that forms a sideband bus. During a DAA process, the topology-based DAA assigns addresses to the memory devices based on their placement on the daisy chain (e.g., their placement within the topology of the sideband bus). The topology-based DAA described herein may facilitate predictably assigning dynamic addresses to memory devices based on, for example, their position on a memory module.

20 Claims, 7 Drawing Sheets

400

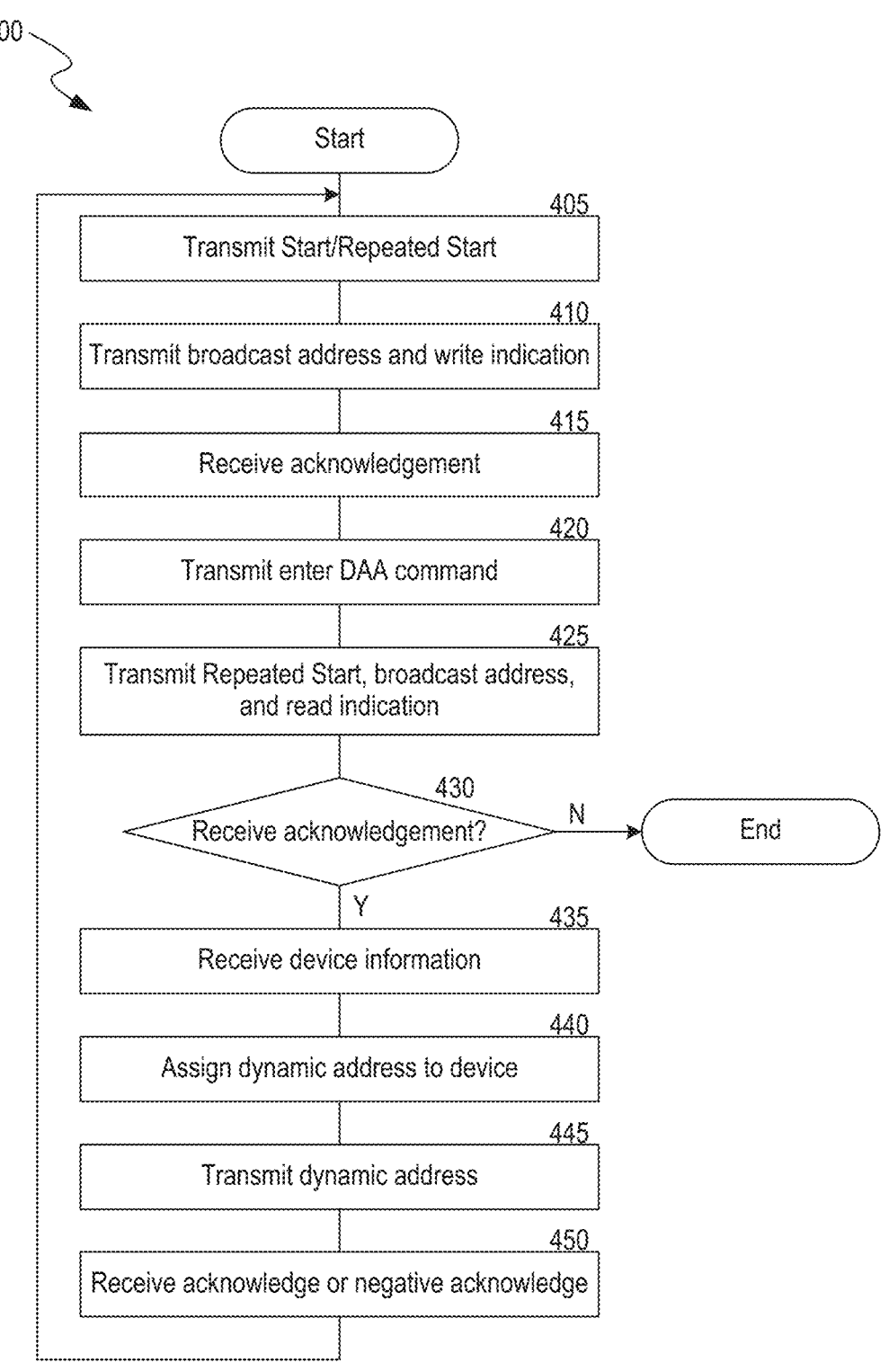

Start

405
Transmit Start/Repeated Start

410
Transmit broadcast address and write indication

415
Receive acknowledgement

420
Transmit enter DAA command

425
Transmit Repeated Start, broadcast address, and read indication

430
Receive acknowledgement?

N → End

Y

435
Receive device information

440
Assign dynamic address to device

445
Transmit dynamic address

450
Receive acknowledge or negative acknowledge

Processing Device
702

Instructions
726

Main Memory
704

Instructions
726

Network Interface
Device
708

Network
720

Bus
730

Static Memory
706

Data Storage Device
718

Machine-Readable
Storage Medium  724

Instructions
726

TOPOLOGY-BASED DYNAMIC ADDRESS ASSIGNMENT OF SEMICONDUCTOR MEMORY DEVICES

CROSS-REFERENCE TO RELATED APPLICATION(S)

The present application claims priority to U.S. Provisional Patent Application No. 63/525,898, filed Jul. 10, 2023, the disclosure of which is incorporated herein by reference in its entirety.

TECHNICAL FIELD

The present disclosure generally relates to a memory device and, more specifically, relates to a memory device that enables dynamically assigning addresses to it and other memory devices based on the topology of the memory devices.

BACKGROUND

Memory devices are widely used to store information related to various electronic devices such as computers, wireless communication devices, cameras, digital displays, and the like. Memory devices may be volatile or non-volatile and can be of various types, such as magnetic hard disks, random access memory (RAM), read-only memory (ROM), dynamic RAM (DRAM), synchronous dynamic RAM (SDRAM), and others. Information is stored in various types of RAM by charging a memory cell to have different states. Improving RAM devices, generally, can include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

The present disclosure will be understood more fully from the detailed description given below and from the accompanying drawings of various embodiments of the disclosure.

FIG. 4 is a flow diagram illustrating a process for assigning topology-based dynamic addresses in accordance with an embodiment of the present technology.

DETAILED DESCRIPTION

Figure 1:
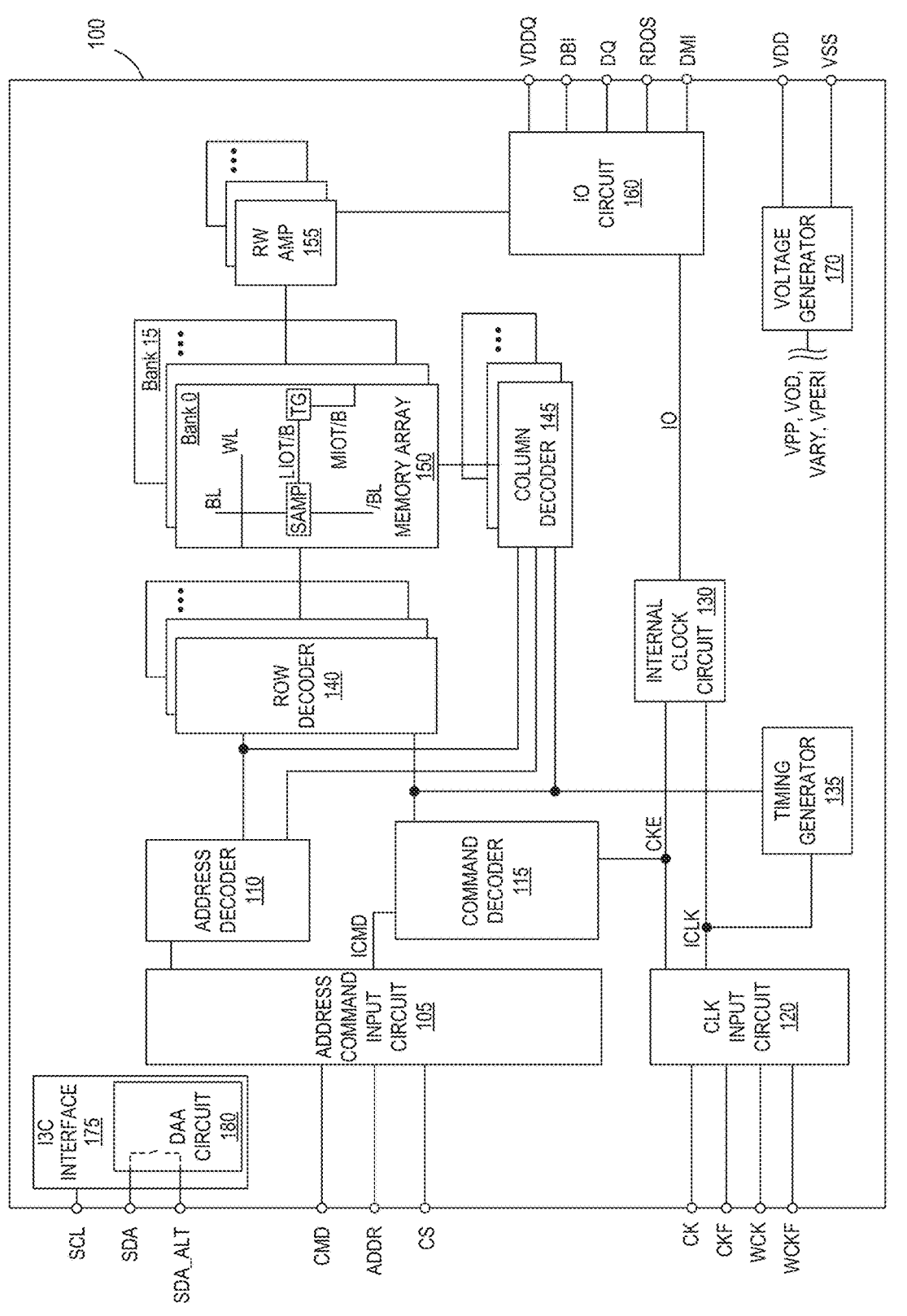
FIG. 1 illustrates a simplified block diagram schematically illustrating a memory device in accordance with an embodiment of the present technology.

Disclosed herein are methods, systems, and apparatuses for a semiconductor memory device (e.g., dynamic random access memory (DRAM)) that is dynamically assigned an address, and facilitates the dynamic assignment of addresses to other memory devices, based on the topology of the memory devices. The addresses may be used to identify the memory devices during communication, such as through a bus, between the memory devices and a controller. The addresses may be predictably assigned to the memory devices based on the location of the memory devices relative to each other and/or the controller (e.g., their topology). For example, memory devices that are closer to the controller (on the bus) may be dynamically assigned lower addresses than memory devices that are further from the controller (on the bus). As described herein, the memory devices may selectively uncouple, and later couple, downstream (e.g., further from the controller) memory devices from the bus during a dynamic address assignment (DAA) process.

Memory devices, such as DRAM, typically include command/address (CA) inputs, through which a host device provides command and/or address information as part of a request by the host for the memory device to perform an operation (e.g., a read or write operation). The memory devices typically also include a bidirectional data bus (DQ) also coupled to the host, over which the memory devices can transmit or receive data. For example, in response to a read request from the host, the memory device can transmit data, read out from a memory array, over the DQ bus. As a further example, as part of a write request from the host, the memory device can receive the data over the DQ bus that is to be written to the memory array.

In some memory systems, the host device uses the same interface (e.g., CA bus and DQ bus) to perform maintenance operations involving the memory devices. For example, the host device may issue a command to a memory device to write a value to a mode register of the memory device using the CA bus, where the data to be written is supplied over the DQ bus. Similarly, the host device may issue a request to the memory device for certain status information using the CA bus, where the memory device provides the status information over the DQ bus. Because these maintenance operations use the CA bus and/or DQ bus that are also used for normal host operations (e.g., requests to write data to or read data from the memory array), the maintenance operations and normal host operations may contend for the CA bus and/or DQ bus and preempt and/or be interrupted by the other.

To enable maintenance operations that do not interfere with normal host operations (e.g., that do not contend for the CA bus and/or DQ bus used for normal host operations), one solution is to utilize an additional communication channel (e.g., a sideband bus, distinct from the CA bus and DQ bus) over which a host and memory devices can communicate. For example, memory systems may provide a sideband bus that conforms to the Improved Inter Integrated Circuit (I3C) specification (e.g., an I3C bus), over which a host device (operating as a controller) and memory devices (operating as targets) can communicate to perform maintenance operations and similar functions. The I3C bus may be a two-wire, shared multidrop (e.g., all components, such as the controller and targets, are electrically connected to the bus), serial data bus, where one wire (SCL) is used as a clock, and the other wire (SDA) is used as a data line.

Memory systems typically include one or more memory modules (e.g., a dual in-line memory module, or DIMM), each of which includes multiple (e.g., 10 or more) memory devices (DRAM die, DRAM device, etc.). Therefore, in order for a host device to communicate with individual memory devices over a sideband bus, each memory device should preferably be associated with an address used by the host device (e.g., controller) and memory devices (e.g., targets) during sideband bus communications. However, there exist various shortcomings with conventional techniques used to assign or otherwise specify addresses that can be used to uniquely identify target memory devices.

For example, some memory modules (e.g., DIMMs that comply with certain versions of the Double Data Rate (DDR) SDRAM standard, such as DDR5) use individual resistors, each having a unique resistance, to differentiate between otherwise identical targets on a sideband bus (e.g., two identical temperature sensors disposed at different locations on the DIMM). Utilizing the same technique to enable unique identification of the memory devices on a memory module, where each memory device is coupled to a uniquely valued external resistor, has several disadvantages. For example, a memory module may have many memory devices (e.g., 10-40 DRAM die), each of which would require a uniquely valued external resistor. Utilizing many uniquely valued external resistors can increase the cost of the memory module, occupy significant memory module real estate, and complicates the memory module's design.

As a further example, the I3C specification provides a DAA mode, entered into when an I3C controller broadcasts an enter dynamic address assignment (ENTDAA) command, in which the controller dynamically assigns addresses to other I3C devices on the I3C bus. During DAA, the I3C controller assigns an address to each of the other I3C devices one at a time, where the I3C device for which an address will be next assigned is based on an arbitration round among the I3C devices for which an address has yet to be assigned (e.g., once a device has been assigned an address by the controller, it does not participate in the next round of arbitration). The arbitration may be determined based on device information (e.g., a provisioned ID, a bus characteristic register (BCR), and/or a device characteristic register (DCR)) that each of the I3C devices attempts to transmit over the SDA line of the I3C bus. However, since the multiple memory devices on a memory module are often identical to one another, they typically have identical information used during DAA arbitration (e.g., provisioned ID, BCR, and/or DCR), which can result in collisions during arbitration. Collisions can result in multiple memory devices being dynamically assigned the same address by the I3C controller, which can cause the I3C bus to operate improperly. As a result, DAA, as provided by I3C (e.g., I3C Specification Versions 1.1.1), would likely fail to successfully dynamically assign addresses to multiple memory devices on a memory module. Further, even if individual memory devices could be modified to avoid collisions (e.g., each has a unique provisioned ID), such a solution poses other challenges. For example, in a memory module with 40 memory devices, the module designer would be required to implement the module using 40 differently configured memory devices, each with a unique provisioned ID, which may be error-prone. As a further example, it can be unpredictable to determine how a dynamically assigned address corresponds to a particular memory device on the memory module, which can make debugging and other activities challenging.

Accordingly, described herein are memory devices, and associated components of memory systems (e.g., memory controllers and/or memory modules), that provide topology-based DAA. As described herein, the memory devices with topology-based DAA are able to participate in a DAA process without causing collisions and without requiring particular circuits or components to differentiate the memory devices (e.g., external resistors), even when the memory devices report identical device information during the DAA process. Furthermore, the memory devices with topology-based DAA operate such that addresses are dynamically assigned to the memory devices in a predictable manner (e.g., where memory devices closer to a controller on a bus are assigned lower addresses).

The memory devices with topology-based DAA are operable to communicate with a controller over a sideband bus, such as an I3C bus or similar shared multidrop serial data bus. Like other I3C-compliant devices, the memory devices with topology-based DAA include an SCL terminal and SDA terminal to facilitate communication using the sideband bus. As described above, the memory devices with topology-based DAA can receive an SCL line, operating as a clock, coupled to the SCL terminal. And the memory devices with topology-based DAA can receive and/or transmit an SDA line, operating as a data line, coupled to the SDA terminal. For example, the memory devices with topology-based DAA can receive data broadcast by another device (e.g., a memory controller or other I3C controller) over the SDA line or transmit data to other I3C devices over the SDA line. The memory devices with topology-based DAA further include an additional terminal to facilitate sideband bus communication, referred to herein as SDA_ALT. The memory device with topology-based DAA can selectively couple its SDA and SDA_ALT terminals. When coupled, a value received at the SDA terminal is transmitted at the SDA_ALT terminal, and a value received at the SDA_ALT terminal is transmitted at the SDA terminal (e.g., when coupled, the memory device with topology-based DAA operates as a bidirectional passthrough of the SDA and SDA_ALT terminals). When the SDA and SDA_ALT terminals are not coupled (e.g., uncoupled), the memory device with topology-based DAA can drive a fixed value (e.g., VDD or VSS) onto SDA_ALT. As described herein, the memory device with topology-based DAA may be configured so that initially (e.g., after reset), the SDA and SDA_ALT terminals are uncoupled and are coupled after the memory device has been assigned an address (e.g., as part of a DAA process).

On a memory module (e.g., a DIMM) that provides topology-based DAA, the data line of the sideband bus may be formed by coupling the SDA_ALT terminal of an upstream memory device (e.g., a memory device closer to a controller on the sideband bus) to the SDA terminal of a downstream memory device (e.g., a memory device further from the controller on the sideband bus). For example, the memory device closest to a controller ("die 0") may have its SDA terminal coupled to the SDA terminal of the controller and its SDA_ALT terminal coupled to the SDA terminal of the next-closest memory device ("die 1"). That memory device ("die 1") may have its SDA_ALT terminal coupled to the SDA terminal of its next-closest memory device ("die 2"), and so on. The SCL line, from the controller, may be coupled to the SCL terminals of all of the memory devices. As described above, the memory devices with topology-based DAA may initialize (e.g., after reset) to an uncoupled state so that initially, only die 0 is coupled to the SDA line of the sideband bus controller. As a result, during a DAA process initiated by the controller, only die 0 will initially receive the controller command and participate in the DAA process, such that die 0 will win arbitration and have a predictable address assigned to it by the controller (e.g., the lowest address assigned by the controller). Subsequently, die 0 may couple its SDA and SDA_ALT terminals so that die 1 also becomes effectively coupled to the SDA line of the controller. During a subsequent phase of the DAA process, die 1 now receives the controller commands and is able to participate, while die 0 does not participate (despite receiving controller commands) because it already has been assigned an address, such that die 1 wins arbitration (as the only participant) and similarly has a predictable address assigned to it (e.g., the next lowest address, after the address assigned by the controller to die 0). As described herein, the DAA process can continue until all memory devices on the module have been selectively coupled to the SDA line of the controller (after the immediately upstream memory device has been assigned an address) and been assigned an address.

In some embodiments, components of a memory system that provides topology-based DAA (e.g., memory controllers, memory modules, and/or memory devices) may communicate over a sideband bus that implements and complies with the I3C specification. In some embodiments, the components of a memory system that provides topology-based DAA may communicate over a sideband bus that implements a specification that is similar to (e.g., is a superset of and/or adopts portions of) the I3C specification. For example, memory controllers, memory modules, and/or memory devices may comply with and communicate over a sideband bus that implements a Memory Module Management Controller (M3C) specification. As described herein, the M3C specification may adopt portions of the I3C specification as well as provide additional features (instead of or in addition to similar I3C features). For example, M3C may provide a DAA mode in which the controller retransmits the command to enter the DAA mode (e.g., ENTDAA) after each phase (e.g., after a memory device has been assigned an address) so that the next-downstream memory device now coupled to the controller's SDA line can receive the command and participate in the next phase of DAA (whereas during prior phases of DAA, the memory device was decoupled from the controller's SDA line and did not receive the command to enter DAA mode). I3C and M3C may be used interchangeably, throughout the present disclosure, to describe the communication specification implemented by the components of the memory system that provides topology-based DAA (e.g., memory controllers, memory modules, and/or memory devices) and the sideband bus over which those components communicate.

Advantageously, the memory system with topology-based DAA predictably assigns addresses to devices (e.g., memory devices) while addressing various shortcomings such as those discussed above. For example, when the memory devices on a memory module are arranged in a daisy chain configuration to form a sideband bus, the first memory device in the chain (e.g., the device closest on the chain to a memory controller) is assigned the lowest address during DAA, the second memory device in the chain is assigned the next lowest address, etc. The memory system with topology-based DAA, in combination with a known topology (e.g., a daisy chain of memory devices), therefore provides a predictable association between dynamically assigned addresses and physical locations (e.g., where on the memory module, where along the daisy chain, etc.) of memory devices. The predictable association between dynamically assigned addresses and, e.g., the location of a memory device on a memory module can be beneficial (e.g., it can make it easier to debug failures of memory devices).

FIG. 1 illustrates a simplified block diagram schematically illustrating a memory device 100 in accordance with embodiments of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells arranged at intersections of the word lines and the bit lines. The selection of a word line WL may be performed by a row decoder 140, and the selection of a bit line BL may be performed by a column decoder 145. Sense amplifiers (SAMP) may be provided for corresponding bit lines BL and connected to at least one respective local input/output (I/O) line pair (LIOT/B), which may, in turn, be coupled to at least one respective main I/O line pair (MIOT/B) via transfer gates (TG), which can function as switches.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, VDDQ, and VSSQ, and on-die termination terminal(s) ODT.

The command terminals and address terminals may be supplied with an address signal and a bank address signal from outside. The address signal and the bank address signal supplied to the address terminals can be transferred, via an address/command input circuit 105, to an address decoder 110. The address decoder 110 can receive the address signals and supply a decoded row address signal (XADD) to the row decoder 140 and a decoded column address signal (YADD) to the column decoder 145. The address decoder 110 can also receive the bank address portion of the ADDR input and supply the decoded bank address signal (BADD) and supply the bank address signal to both the row decoder 140 and the column decoder 145.

The command and address terminals may be supplied with command signals CMD, address signals ADDR, and chip select signals CS from a memory controller. The command signals may represent various memory commands from the memory controller (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the address/command input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK (not shown in FIG. 1).

The command decoder 115, in some embodiments, may further include one or more registers for tracking various counts or values (e.g., counts of refresh commands received by the memory device 100 or self-refresh operations performed by the memory device 100). In some embodiments, a subset of registers may be referred to as mode registers and configured to store user-defined variables to provide flexibility in performing various functions, features, and modes and/or to provide information characterizing aspects of the memory device 100. For example, the memory device 100 may receive a signaling from a host device to program mode registers with specified values (e.g., to configure the memory device). As a further example, the memory device 100 may receive a signaling from a host device to read out the values from certain mode registers (e.g., to obtain certain status information from the memory device).

When a read command is issued to a bank with an open row and a column address is timely supplied as part of the read command, read data can be read from memory cells in the memory array 150 designated by the row address (which may have been provided as part of the Activate command identifying the open row) and column address. The read command may be received by the command decoder 115, which can provide internal commands to IO circuit 160 so that read data can be output from the data terminals DQ, RDQS, DBI, and DMI via read/write amplifiers 155 and the IO circuit 160 according to the RDQS clock signals. The read data may be provided at a time defined by read latency information (RL) that can be programmed in the memory device 100, for example, in a mode register. The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open row and a column address is timely supplied as part of the write command, write data can be supplied to the data terminals DQ, DBI, and DMI according to the WCK and WCKF clock signals. The write command may be received by the command decoder 115, which can provide internal commands to the IO circuit 160 so that the write data can be received by data receivers in the IO circuit 160 and supplied via the IO circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in a mode register. The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the IO circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the IO circuit 160 so that power supply noise generated by the IO circuit 160 does not propagate to the other circuit blocks.

The on-die termination terminal(s) may be supplied with an on-die termination signal ODT. The on-die termination signal ODT can be supplied to the IO circuit 160 to instruct the memory device 100 to enter an on-die termination mode (e.g., to provide one of a predetermined number of impedance levels at one or more of the other terminals of the memory device 100).

The clock terminals and data clock terminals may be supplied with external clock signals and complementary external clock signals. The external clock signals CK, CKF, WCK, and WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level, a complementary clock signal is at a high level, and when the clock signal is at a high clock level, the complementary clock signal is at a low clock level. Moreover, when the clock signal transitions from the low clock level to the high clock level, the complementary clock signal transitions from the high clock level to the low clock level, and when the clock signal transitions from the high clock level to the low clock level, the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase- and frequency-controlled internal clock signals based on the received internal clock signals ICLK and a clock enable signal CKE from the command decoder 115. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the IO circuit 160 and can be used as a timing signal for determining an output timing of read data and the input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135, and thus various internal clock signals can be generated.

The memory device 100 may additionally employ a plurality of external terminals coupled to a sideband bus. That is, the memory device may include a clock terminal to receive a sideband bus clock signal, SCL. The memory device may include an upstream data terminal to couple to an upstream (e.g., closer to the bus controller) bus data signal, SDA. And the memory device may include a downstream data terminal to couple to a downstream bus data signal, SDA_ALT. During operations, the memory device 100 may receive or transmit the signals SDA and SDA_ALT. For example, the memory device 100 may attempt to broadcast data over the sideband bus and therefore attempt to transmit over SDA and/or SDA_ALT. As a further example, the memory device 100 may not be broadcasting and instead receives sideband bus data (e.g., from a host device or another memory device) over SDA and/or SDA_ALT. As described herein, the memory device 100 may be configured to selectively couple the SDA terminal to the SDA_ALT terminal.

The memory device 100 additionally includes an I3C interface 175, which is configured to interface with the sideband bus. The I3C interface 175 may be coupled to the sideband bus signals SCL, SDA, and/or SDA_ALT and includes logic to implement all or portions of a communication protocol used by the sideband bus (e.g., I3C, M3C, or similar). That is, the I3C interface 175 may be configured to receive and decode commands transmitted over the sideband bus (e.g., from a host device or other component operating as a bus controller), perform operations based on the commands, transmit data over the sideband bus in response to the commands, etc. For example, the I3C interface 175 may be configured to receive and decode a command, broadcast by a host device, to enter a DAA mode (e.g., an ENTDAA command). In response, the I3C interface 175 can determine whether an address has already been assigned to the memory device 100 (for example, following a previous command from a host device to enter a DAA mode). If the memory device 100 has not yet been assigned an address, the I3C interface 175 can transmit device information (e.g., a provisioned ID, BCR, and/or DCR) over the sideband bus during an arbitration round. If the I3C interface 175 determines that it won the arbitration round, it can be configured to receive a dynamic address over the sideband bus and acknowledge receipt. The I3C interface 175 can also be configured to maintain the assigned dynamic address and indication that the memory device has been assigned an address (e.g., in one or more registers).

The I3C interface 175 additionally includes a DAA circuit 180, which is configured to facilitate topology-aware DAA of the memory device 100. As illustrated in FIG. 1, the DAA circuit 180 may be configured to couple the upstream data terminal of the memory device 100 to the downstream data terminal of the memory device, thereby coupling the corresponding sideband bus data signals (e.g., SDA and SDA_ALT). In embodiments, the DAA circuit 180 is configured to initially (e.g., after power on or reset of the memory device 100) uncouple the upstream data terminal from the downstream data terminal. The DAA circuit 180 may be configured to then couple the terminals once the memory device 100 has been assigned an address (e.g., as part of a DAA process). For example, the DAA circuit 180 can be configured to couple the upstream data terminal to the downstream data terminal based on a valid bit (e.g., maintained by the DAA circuit in a register) indicating the memory device 100 has been assigned an address. In other words, the DAA circuit 180 can facilitate selectively coupling downstream components (e.g., other memory devices) to the data line of a sideband bus once the memory device 100 has been assigned a dynamic address and will no longer contend with the other memory devices during a DAA process.

Figure 2:
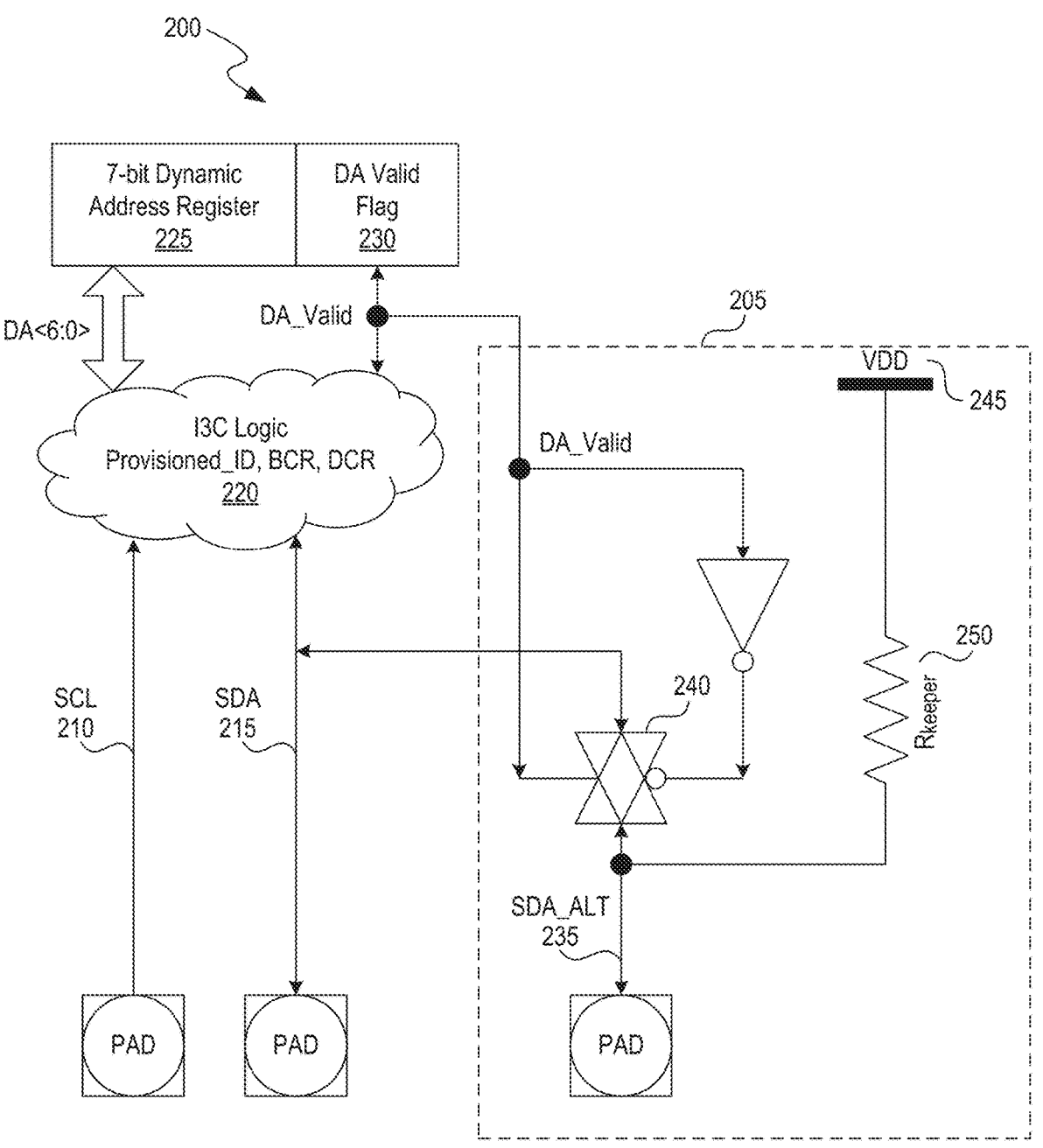
FIG. 2 is a simplified block diagram schematically illustrating a sideband bus interface, with a topology-based dynamic address assignment (DAA) circuit, in accordance with an embodiment of the present technology.

FIG. 2 is a simplified block diagram schematically illustrating a sideband bus interface 200, with a topology-based DAA circuit 205, in accordance with an embodiment of the present technology. The sideband bus interface 200 may be part of a memory device (e.g., a DRAM die, a DRAM device, etc.). The sideband bus interface 200 may be an example of or include aspects of the I3C interface 175 described with reference to FIG. 1. The topology-based DAA circuit 205 may be an example of or include aspects of the DAA circuit 180 described with reference to FIG. 1.

The sideband bus interface 200 may be used to enable communication between the memory device and sideband bus, such as an I3C bus or an M3C bus. The sideband bus interface 200 may couple to wires of the sideband bus, such as SCL 210 and SDA 215, through one or more external terminals and/or pads. SCL 210 may operate as the clock of the sideband bus, and SDA 215 may operate as the data line of the sideband bus. As described herein, SDA 215 may be coupled to a bus controller (e.g., a host device, memory controller, or other component therein) that controls the operation of the sideband bus. In some embodiments, SDA 215 (of the sideband bus interface 200) is directly coupled to the bus controller (e.g., there are no intervening devices on the sideband bus). In some embodiments, the coupling between SDA 215 (of the sideband bus interface 200) and the bus controller passes through one or more other devices on the sideband bus (e.g., memory devices), such as in a daisy chain. Any intervening devices between the memory device of the sideband bus interface 200 and the bus controller may be referred to as upstream devices.

The sideband bus interface 200 includes I3C logic 220, which implements at least a portion of the communication protocol used by the sideband bus (e.g., I3C, M3C, or similar). The I3C logic 220 may be configured to detect and decode commands transmitted by the bus controller over SDA 215, perform operations based on the commands (e.g., performing bus functions, performing functions on the memory device, etc.), and transmit data over SDA 215. For example, upon detecting a command to enter a DAA mode (e.g., an ENTDAA command), the I3C logic 220 may be configured to attempt to transmit information associated with the memory device (e.g., provisioned ID, BCR, and DCR) over SDA 215 during an arbitration round if the memory device has not already been assigned an address. If the I3C logic 220 determines that it won the arbitration round (e.g., it transmitted the lowest-valued provisioned ID, BCR, and DCR among the memory devices participating in the arbitration round), it can be configured to receive a dynamic address (assigned by the bus controller) from SDA 215 and save the dynamic address to a dynamic address register 225. The I3C logic 220 can also set a DA valid flag 230 (e.g., in a register) to indicate that an address has been assigned to the memory device. During subsequent arbitration rounds of the DAA mode, the I3C logic 220 may be configured not to participate (e.g., not to transmit device information and detect a win condition) based on the state of the DA valid flag 230.

The sideband bus interface 200 may also couple to an additional sideband bus wire SDA_ALT 235 through an external terminal and/or pad. SDA_ALT 235 may provide the data line of the sideband bus to downstream devices (e.g., memory devices farther from the bus controller). That is, as described herein, SDA_ALT 235 may connect to the SDA external terminal and/or pad of a downstream device. During operation of the sideband bus interface 200, and the memory device of which it is a part, SDA 215 and SDA_ALT 235 may be selectively coupled or uncoupled. When coupled, a logical connection is formed between SDA 215 and SDA_ALT 235 so that a value on SDA propagates to SDA_ALT (e.g., a value broadcast by the memory device of sideband bus interface 200, an upstream memory device, and/or the bus controller propagates to a downstream memory device), and a value on SDA_ALT propagates to SDA (e.g., a value broadcast by a downstream memory device propagates to the memory device of the sideband bus interface, upstream memory devices, and/or the bus controller). When uncoupled, values do not propagate between SDA 215 (e.g., associated with a bus controller, upstream memory devices, and/or the memory device of sideband bus interface 200) and SDA_ALT 235 (e.g., associated with downstream memory devices).

Coupling between SDA 215 and SDA_ALT 235, at the sideband bus interface 200, may be controlled by the topology-based DAA circuit 205. The topology-based DAA circuit 205 may include a transmission gate 240, configurable to connect SDA 215 to SDA_ALT 235. For example, the transmission gate 240 may connect SDA 215 to SDA_ALT 235 once the memory device of sideband bus interface 200 has been dynamically assigned an address. In some embodiments, the transmission gate 240 is controlled by DA valid flag 230. In embodiments, DA valid flag 230 may initially (e.g., after power on and/or reset of the memory device) indicate that the memory device has not been dynamically assigned an address. For example, DA valid flag 230 may be provided by a register that resets to a logical value of 0. Once DA valid flag 230 is set after the memory device has been assigned an address (e.g., following a portion of a DAA process, as described herein), transmission gate 240 is activated to connect SDA 215 and SDA_ALT 235. For example, as illustrated in FIG. 2, transmission gate 240 may be controlled by DA valid flag 230 and its inverse.

The topology-based DAA circuit 205 may also be configured to drive a known static value on SDA_ALT 235 (e.g., the sideband bus data wire of downstream memory devices), when SDA_ALT and SDA 215 are not coupled, to prevent SDA_ALT from floating (e.g., having an unknown value). For example, as illustrated in FIG. 2, the topology-based DAA circuit 205 may connect SDA_ALT 235 to VDD 245 through a weak pull-up resistor 250. The resistance of weak pull-up resistor 250 may be such that when transmission gate 240 enables the connection between SDA 215 and SDA_ALT 235, logical 0 values (e.g., VSS) may propagate between SDA and SDA_ALT despite the connection to VDD 245 (e.g., SDA_ALT does not remain stuck at VDD).

Figure 3:
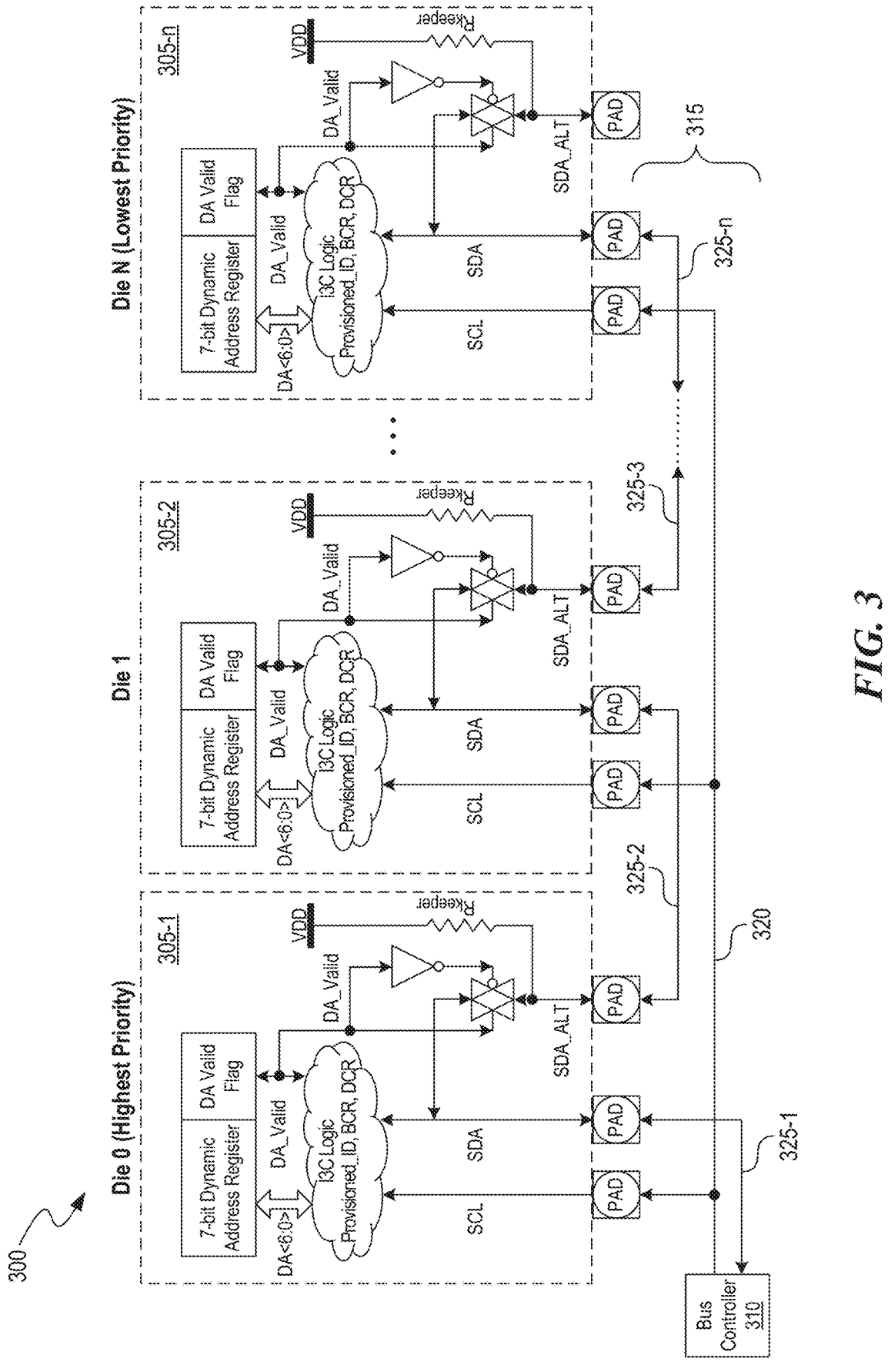
FIG. 3 is a simplified block diagram schematically illustrating a daisy chain between memory devices with topology-based DAA circuits, forming a sideband bus, in accordance with an embodiment of the present technology.

FIG. 3 is a simplified block diagram schematically illustrating a daisy chain 300 between memory devices with topology-based DAA circuits, forming a sideband bus, in accordance with an embodiment of the present technology. The daisy chain 300 may be formed by one or more memory devices 305, each of which may have logic to perform topology-based DAA. For example, each of the memory devices 305 may be a memory device 100 described in reference to FIG. 1 and/or a topology-based DAA circuit 205 described in reference to FIG. 2.

As illustrated in FIG. 3, the daisy chain 300 can include memory device 305-1, memory device 305-2, etc., up to memory device 305-n (e.g., any number of memory devices). The memory devices 305 may be part of a memory module (e.g., a DIMM) or other arrangement in a memory system (e.g., on multiple DIMMs). Based on their topology on the daisy chain 300, the memory devices 305 may have a different priority for being assigned an address during a DAA process. For example, in the embodiment illustrated in FIG. 3, memory device 305-1 is the highest priority memory device (e.g., the first of the memory devices 305 to be assigned an address during a DAA process), and memory device 305-n is the lowest priority memory device (e.g., the last of the memory devices to be assigned an address during a DAA process). As described herein, memory device 305-1 may have the highest priority due to it being the closest to a bus controller 310 (e.g., a memory controller, host device, or other component of a memory system) on a sideband bus 315.

The sideband bus 315 includes an SCL wire 320, which can be used to provide the clock line for the sideband bus. The SCL wire 320 is common to all memory devices 305. That is, as illustrated in FIG. 3, the same SCL wire 320 (e.g., driven by the bus controller 310) connects to the SCL terminals of all memory devices 305 (e.g., memory device 305-1, memory device 305-2, etc., up to memory device 305-n).

The sideband bus 315 additionally includes one or more SDA segments, which collectively form the data line of the sideband bus. Each SDA segment serially connects a memory device (e.g., one of memory devices 305-1 through 305-n) to another memory device or connects the bus controller 310 to a first memory device (e.g., the highest priority memory device). SDA segments connecting two memory devices 305 may connect to an upstream data line terminal of one of the memory devices (e.g., an SDA pad) and to a downstream data line terminal of the other memory device (e.g., an SDA_ALT pad). Further, the SDA segment connected to the highest priority memory device may connect to its upstream data line terminal (e.g., the SDA pad). For example, as illustrated in FIG. 3, bus controller 310 and memory device 305-1 are connected by SDA segment 325-1; the SDA segment connects to the SDA pad of the memory device. Further, SDA segment 325-1 connects to the SDA_ALT pad of memory device 305-1 and the SDA pad of memory device 305-2 to connect those two memory devices. Still further, SDA segment 325-3 connects to the SDA_ALT pad of memory device 305-1 and to the SDA pad of the next lowest priority memory device on the sideband bus 315 (not shown). Similarly, memory device 305-n (illustrating the lowest priority memory device on the sideband bus 315) connects to SDA segment 325-n via the memory device's SDA pad; the SDA segment also connects to the SDA_ALT pad of the next highest priority memory device (not shown). As illustrated in FIG. 3, the SDA_ALT pad of each memory device 305 may additionally be coupled to VDD through a pull-up resistor.

As described herein, each SDA segment may be selectively coupled to or uncoupled from the next SDA segment in the daisy chain 300 based on the operation of the memory devices 305 (e.g., the topology-based DAA circuits therein). For example, when the memory devices 305 are in an initial state (e.g., after power on or reset), the topology-based DAA circuits of each memory device may uncouple their SDA pad from their SDA_ALT pad. A memory device may be configured to leave its SDA pad uncoupled from its SDA_ALT pad until the memory device has been assigned an address as part of a DAA process. As a result, during an initial period (e.g., prior to the completion of a first phase of a DAA process), only memory device 305-1 is configured to receive data signals broadcast by bus controller 310 (since SDA segment 325-1 is connected to its SDA pad); all other memory devices are uncoupled from the upstream SDA segments and do not receive data broadcast by the bus controller. After an address is assigned to memory device 305-1 (e.g., during a first phase of a DAA process), the topology-based DAA circuit of the memory device couples its SDA and SDA_ALT pads, thereby coupling SDA segment 325-2 to SDA segment 325-1. As a result, memory device 305-2 becomes coupled to the data portion of sideband bus 315 and is able to receive data broadcast by bus controller 310. After the memory device 305-2 is assigned an address during a next phase of the DAA process, it couples its SDA and SDA_ALT pads, thereby coupling SDA segment 325-2 and SDA segment 325-3 and coupling the next memory device to the data portion of sideband bus 315. The process continues until the lowest memory device (e.g., memory device 305-*n*) is coupled to the data portion of sideband bus 315, after which it may be assigned an address via the DAA process. By coupling the memory devices 305 to the data portion of sideband bus 315 in a serial fashion, after which an address may be assigned to the most recently coupled memory device, addresses may be assigned to the memory device in a predictable fashion (e.g., based on their proximity to bus controller 310 along the daisy chain 300).

In some embodiments, additional devices other than memory devices 305 may also be coupled to the sideband bus 315 to communicate with the bus controller 310. For example, one or more temperature sensors, power management integrated circuits (PMICs), and/or other devices can share the sideband bus 315 with the memory devices 305 (e.g., are part of the same group). In some embodiments, one or more other devices (e.g., temperature sensors and/or PMICs) are coupled to a separate sideband bus, not shown, that also couples to the bus controller 310 (e.g., the devices are part of a group separate from the memory devices 305).

FIG. 4 is a flow diagram illustrating a process 400 for assigning topology-based dynamic addresses in accordance with an embodiment of the present technology. Aspects of the process 400 can be performed, for example, by a component of a memory system operating as a controller of a sideband bus (e.g., a bus controller), such as a host device, memory controller, or combination thereof. The bus controller can perform the process 400 in compliance with I3C, M3C, or other specification of a sideband bus. Although the process 400 describes transmitting and receiving values, in embodiments, each value and each portion of a value are transmitted serially over one or more clock cycles. For example, one data bit may be transmitted or received over the sideband bus per clock cycle. In some embodiments, a value transmitted by one device is received by multiple other devices on the sideband bus (e.g., the value is broadcast).

The process 400 begins at block 405, where a bus controller transmits a start or repeated start indication over the sideband bus. For example, the bus controller may transmit the start indication the first time performing block 405 and may transmit the repeated start indication when subsequently performing block 405.

At block 410, the bus controller transmits a global broadcast address and a write indication. The global broadcast address may be transmitted so that other devices on the sideband bus, such as memory devices (e.g., targets), see a command code to be subsequently transmitted. The write indication may indicate that the transmitter (e.g., bus controller) is writing a message to the targets. In some embodiments, the global broadcast address is a 7-bit value, such as 7'h7E. In some embodiments, the write indication is transmitted as an RnW bit set to the value 1'b0.

At block 415, the bus controller receives an acknowledgement (e.g., ACK) from the targets. In some embodiments, targets (e.g., the memory devices on the sideband bus) acknowledge by driving a data line of the sideband bus (e.g., SDA) low. In some embodiments, targets on the bus will send an acknowledgement regardless of whether the target has been assigned a dynamic address.

At block 420, the bus controller transmits a command to instruct targets to enter a DAA procedure. In some embodiments, the command is an ENTDAA command as defined by the I3C specification. In some embodiments, the command is similar to the I3C ENTDAA command (e.g., an "enter dynamic address assignment" command as defined by the M3C specification).

At block 425, the bus controller transmits a repeated start indication, the global broadcast address, and a read indication. In some embodiments, the read indication is transmitted as an RnW bit set to the value of 1'b1. In some embodiments, every target on the sideband bus that supports DAA and does not yet have an assigned dynamic address is configured to acknowledge the transmitted broadcast address.

At decision block 430, the bus controller determines whether it receives at least one acknowledgement from the targets on the sideband bus (e.g., memory devices). In some embodiments, at most one target will acknowledge the broadcast address transmitted at block 425. For example, as described herein, in some embodiments, only one memory device coupled to the data portion of the sideband bus will not yet have an assigned dynamic address and therefore will acknowledge (where upstream memory devices already have been assigned a dynamic address and therefore do not acknowledge, and downstream memory devices have not yet been coupled to the data portion of the sideband bus and therefore do not receive the transmitted information). If the bus controller determines that at least one target acknowledges the broadcast address, then processing continues to block 435. If the bus controller determines that no targets acknowledged the broadcast address (e.g., a negative acknowledgement, or NACK), then the process ends.

At block 435, the bus controller receives device information over the sideband bus. The device information can include a provisioned ID, BCR, and/or DCR. In some embodiments, the device information is received during an arbitration round. In some embodiments, only a single memory device participates in the arbitration round (e.g., the memory device most recently coupled to the data portion of the sideband bus).

At block 440, the bus controller assigns a dynamic address to the memory device associated with the received device information (e.g., the winning memory device of the arbitration round). In some embodiments, the assigned dynamic address follows a predictable pattern with respect to a previously assigned dynamic address (e.g., from the previous arbitration round). For example, the bus controller, memory controller, and/or firmware of the memory system may be configured to assign addresses according to a specified pattern. In some embodiments, the assigned dynamic address may be the next sequential (greater or lower) address after the previously assigned dynamic address. For example, addresses may be in a monotonically increasing or decreasing manner (e.g., in increments or decrements of 1, 2, 3, etc.) with each next memory device starting from the first memory device (e.g., the memory device closest on the bus to the bus controller). In some embodiments, addresses are assigned such that the memory devices in the middle of the bus (e.g., between the bus controller and the last memory device in a daisy chain) have the lower-valued addresses. In embodiments, other address assignments may be used that assign lower-valued addresses (e.g., higher priority addresses) to memory devices depending on the topology, such that those devices are given higher priority. The bus controller may additionally maintain an association between the newly assigned dynamic address and the device information (and, therefore, the corresponding memory device). Since the dynamic addresses are assigned to the memory devices in a predictable manner (e.g., the address incrementing with each memory device that is farther on the sideband bus from the bus controller), the maintained association facilitates targeting known memory devices based on their assigned address. For example, a bus controller can target the nearest memory device using the lowest-valued assigned address, the further memory device used the highest-valued assigned address, etc.

At block 445, the bus controller transmits the assigned dynamic address to the winning memory device. At block 450, the bus controller receives an acknowledgement or a negative acknowledgement from the winning device, therefore concluding a phase or round of DAA. In some embodiments, if the bus controller receives a negative acknowledgement (e.g., indicating that the winning device did not successfully receive the transmitted dynamic address), then the address that had been assigned is freed to be reassigned during a subsequent arbitration round.

The process 400 then returns to block 405 to transmit a repeated start prior to transmitting the global broadcast address and write indication (at block 410), instructing memory devices to enter a DAA procedure (at block 420) and determining whether another round of arbitration and address assignment is needed (at decision block 430) (e.g., for another phase of DAA). It will be noted that in contrast to other DAA processes that do not involve repeated transmissions of the command to enter a DAA procedure, the illustrated embodiment of process 400 transmits the enter DAA command after each phase of DAA. For example, the bus controller retransmits the enter DAA command with each new phase because memory devices downstream of the one assigned an address during the previous phase were not coupled to the data portion of the sideband bus during that previous phase.

Figure 5:
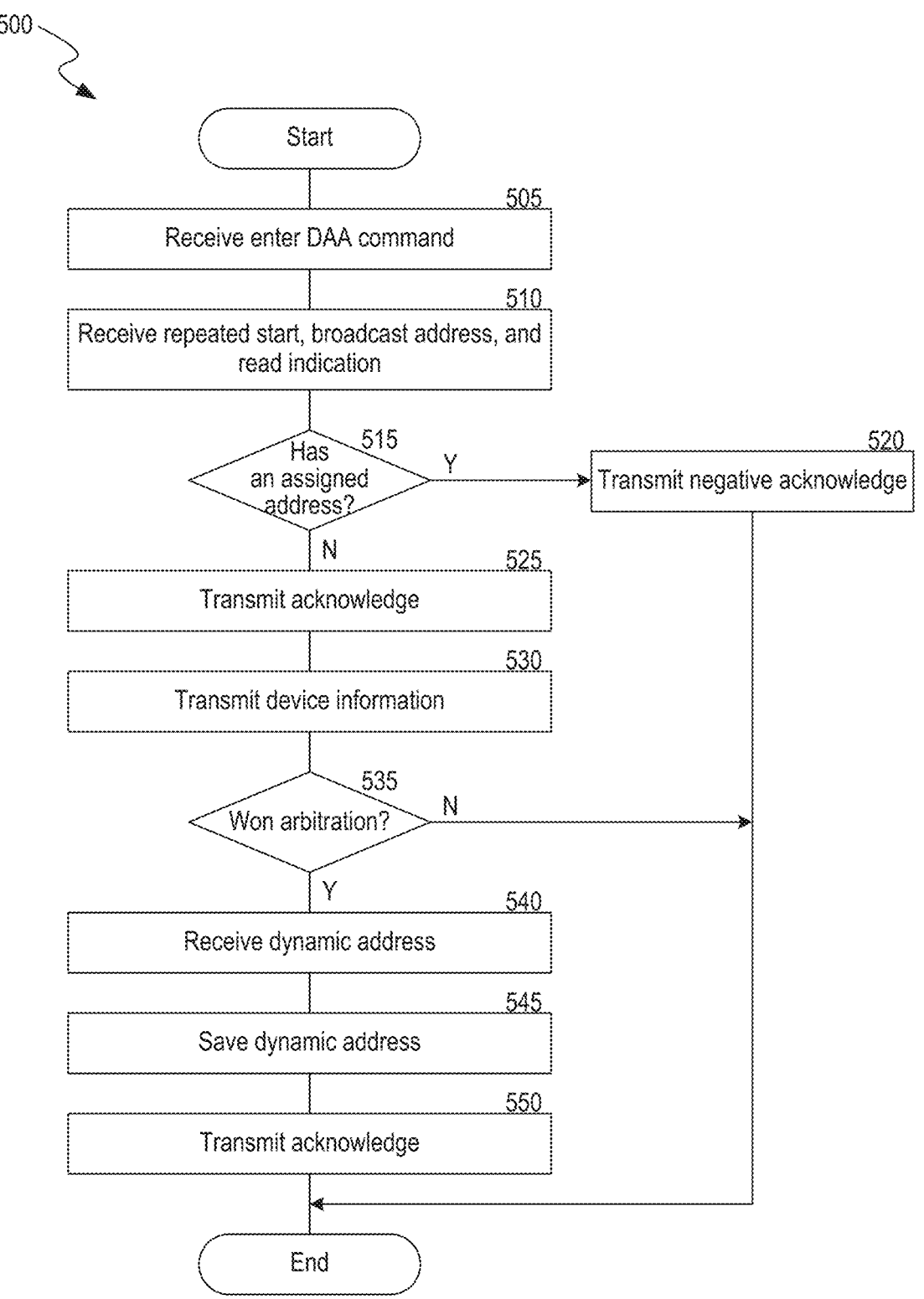
FIG. 5 is a flow diagram illustrating a process for being assigned a topology-based dynamic address in accordance with an embodiment of the present technology.

FIG. 5 is a flow diagram illustrating a process 500 for being assigned a topology-based dynamic address in accordance with an embodiment of the present technology. Aspects of the process 500 can be performed, for example, by a target device on a sideband bus, such as a memory device and/or a topology-based DAA circuit that is part of the device. For example, the process 500 can be performed by the memory device 100 illustrated in FIG. 1 (in some embodiments including the I3C interface 175 and/or DAA circuit 180), sideband bus interface 200 illustrated in FIG. 2, and/or one of the memory devices 305 illustrated in FIG. 3. The target device can perform the process 500 in compliance with I3C, M3C, or other specification of a sideband bus. Although the process 500 describes transmitting and receiving values, in embodiments, each value and each portion of a value are transmitted serially over one or more clock cycles. For example, one data bit may be transmitted or received over the sideband bus per clock cycle. In some embodiments, a value transmitted by one device is received by multiple other devices on the sideband bus (e.g., the value is broadcast).

The process 500 begins at block 505, where a target device receives a command to enter a DAA procedure. In some embodiments, the received command is an ENTDAA command as defined by the I3C specification. In some embodiments, the received command is similar to the I3C ENTDAA command (e.g., an "enter dynamic address assignment" command as defined by the M3C specification).

At block 510, the target device receives a repeated start indication, a global broadcast address, and a read indication. In some embodiments, the read indication is received as an RnW bit set to the value of 1'b1. In some embodiments, the global broadcast address is a 7-bit value, such as 7'h7E.

At decision block 515, the target device determines whether it has an assigned address. In some embodiments, the determination is made based on a dynamic address register and/or valid register maintained by the target device (e.g., does the register indicate a valid address). As described herein, the target device may have been assigned a dynamic address during a DAA process. If the target device determines that it has an assigned address, processing continues to block 520. If the target device determines that it does not have an assigned address, processing continues to block 525.

If at decision block 515, the target device determined that it has an assigned address, then at block 520, the target device transmits a negative acknowledgement. In some embodiments, the target device indicates a negative acknowledgement by driving the data portion of the sideband bus high or by not driving a value on the data portion of the sideband bus. The process 500 then ends.

If at decision block 515, the target device determined that it has not been assigned an address, then at block 525, the target device transmits an acknowledgement. In some embodiments, the target device indicates an acknowledgement by driving the data portion of the sideband bus low.

At block 530, the target device transmits device information associated with it. The device information can include a provisioned ID, BCR, and/or DCR.

At decision block 535, the target device determines whether it won arbitration during transmission of the device information (at block 530). In some embodiments, the target device determines whether it won arbitration based on whether it successfully transmitted the device information over the sideband bus. For example, the sideband bus may be configured (e.g., by operation of the bus controller) to have a default logic high value (e.g., 1). The default logic high value may be overridden if a target device attempts to transmit a logic low value (e.g., 0) over the sideband bus. The target devices and sideband bus may be configured so that if one target device attempts to transmit a logic high value and another target device attempts to transmit a logic low value, the target device transferring the logic low value wins (e.g., the sideband bus goes low). A target device wins arbitration if it transmitted its device information without being overridden by another target device during transmission (e.g., the target device transmitted its device information without an occurrence of it attempting to transmit a logic high value when at the same time another target device attempted, and succeeded in, transferring a logic low value). In some embodiments, the target device with the lowest-valued device information wins arbitration. In some embodiments, no other devices attempt to transmit their device information (e.g., based on the operation of topology-based DAA circuits), and the target device will win arbitration. If the target device determines that it won arbitration, processing continues to block 540. If the target device determines that it did not win arbitration, the process 500 ends.

At block 540, the target device receives a dynamic address over the sideband bus (e.g., from the bus controller). In some embodiments, the received dynamic address is a 7-bit value assigned by the bus controller.

At block 545, the target device saves the received dynamic address. For example, the target device may save the received dynamic address in a dynamic address register. The target device may also set a flag (e.g., in a register) indicating it has a valid dynamic address. As described herein, following the saving of the assigned dynamic address, the target device may couple an upstream data terminal (e.g., SDA) with a downstream data terminal (e.g., SDA_ALT) of the target device.

At block 550, the target device transmits an acknowledgement indication. The process 500 then ends.

Figure 6:
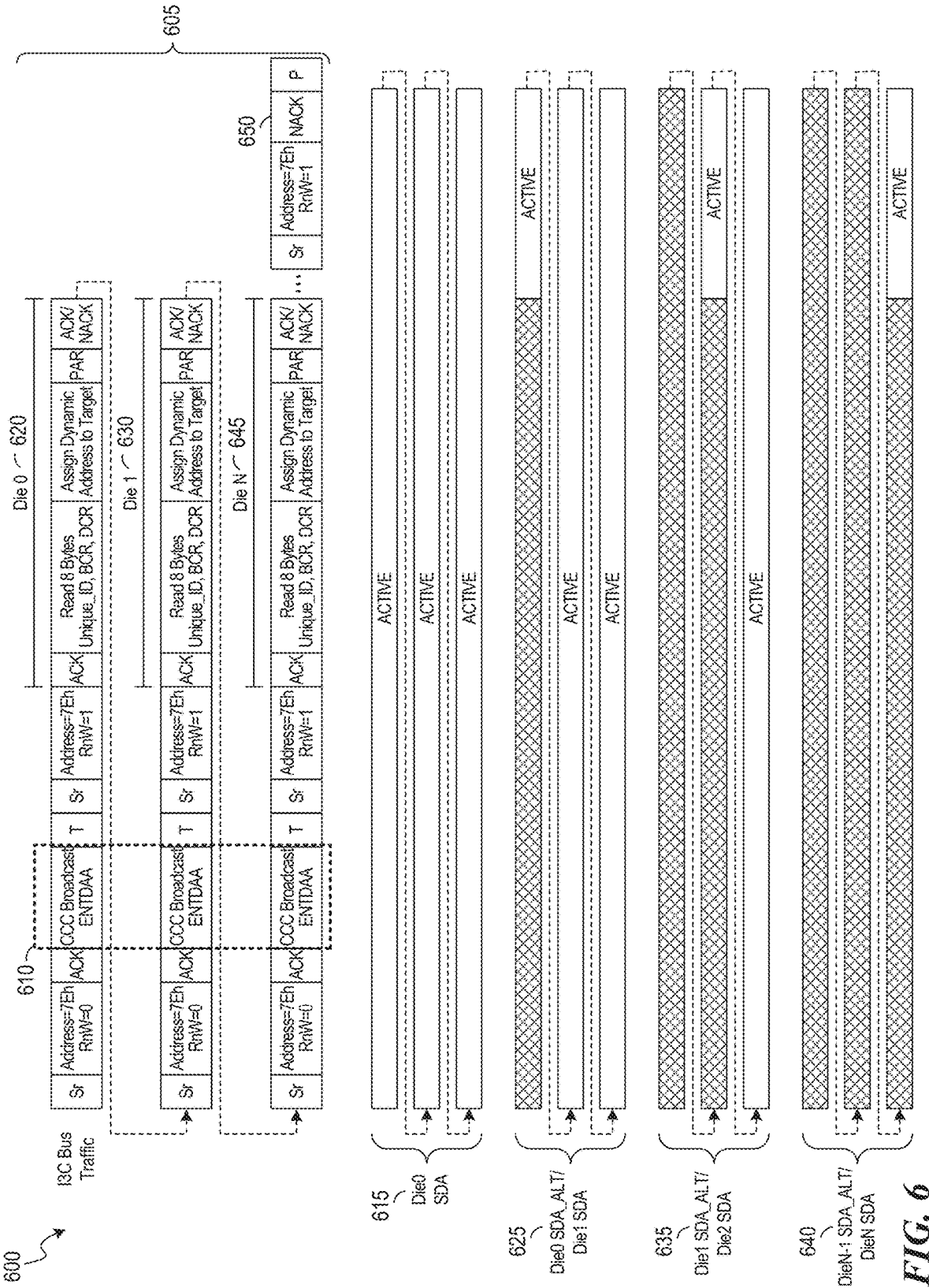
FIG. 6 is a timing diagram illustrating a topology-based DAA sequence in accordance with an embodiment of the present technology.

FIG. 6 is a timing diagram illustrating a topology-based DAA sequence 600 in accordance with an embodiment of the present technology. The topology-based DAA sequence 600 involves bus communications 605 over a sideband bus, such as an I3C bus, M3C bus, or other. As illustrated in FIG. 6, the bus communications 605 may include communications from a bus controller (e.g., a memory controller, host device, and/or other component of a memory system) as well as from one or more target devices (e.g., memory devices). In particular, the topology-based DAA sequence 600 may involve repeated broadcasts 610 of an enter DAA command by the bus controller.

As illustrated in FIG. 6, during an initial phase of the topology-based DAA sequence 600, a Die0 SDA 615 may be active. In the embodiment illustrated in FIG. 6, Die0 may be the highest priority of multiple memory dies on the sideband bus (e.g., the one closest to the bus controller on the sideband bus data chain), and its SDA terminal may be directly coupled to the SDA terminal of the bus controller. That is, Die0 may be capable of receiving data from, and transmitting data to, the bus controller over the sideband bus SDA line first (e.g., before other memory dies). As a result, Die0 completes DAA phase 620 in response to the first enter DAA command broadcast by the bus controller.

Following the completion of DAA phase 620 by Die0, Die1 SDA 625 goes active. As described herein, Die0 may couple its SDA terminal to its SDA_ALT terminal, therefore activating its SDA_ALT terminal (e.g., coupling its SDA_ALT to the sideband bus SDA line and the bus controller), after it has been dynamically assigned an address. Further, Die0 SDA_ALT may be coupled to Die1 SDA 625, such that the activation of Die0 SDA_ALT further activates Die1 SDA. As a result, when the bus controller broadcasts the second enter DAA command, Die1 completes DAA phase 630.

Following the completion of DAA phase 630 by Die1, Die2 SDA 635 goes active (e.g., by way of Die1 coupling its SDA and SDA_ALT terminals). The topology-based DAA sequence 600 continues, with dies completing DAA phases (e.g., being assigned an address) and activating the SDA line of the next lowest priority memory die. Eventually, the memory die with the second lowest priority, DieN−1, is assigned a dynamic address and activates DieN SDA 640 (e.g., the SDA terminal of the die with the lowest priority on the sideband bus). As a result, when the bus controller broadcasts the next (N+1st) enter DAA command, DieN completes DAA phase 645. Following an additional (N+2nd) broadcast of the enter DAA command (not shown), and based on a subsequent negative acknowledgement 650 by the memory dies (indicating that all of the memory dies have been assigned a dynamic address), the topology-based DAA sequence 600 ends.

Figure 7:
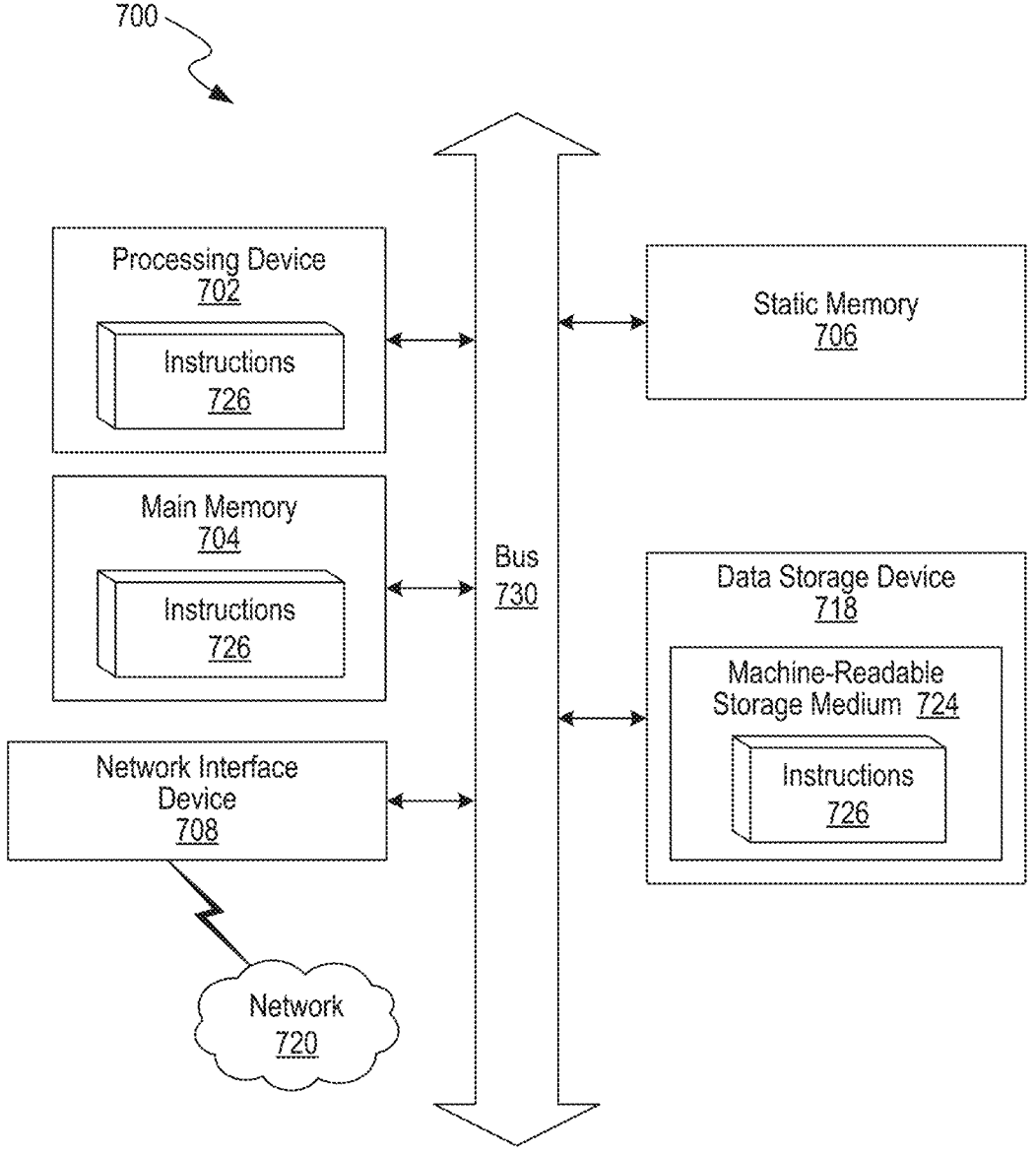
FIG. 7 is a block diagram of an example computer system in accordance with an embodiment of the present disclosure.

FIG. 7 illustrates an example machine of a computer system 700 within which a set of instructions for causing the machine to perform any one or more of the methodologies discussed herein can be executed. In alternative embodiments, the machine can be connected (e.g., networked) to other machines in a LAN, an intranet, an extranet, and/or the internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, DRAM such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730. In accordance with one aspect of the present disclosure, the main memory 704 can perform topology-based DAA.

The processing device 702 represents one or more general-purpose processing devices such as a microprocessor, a central processing unit, or the like. More particularly, the processing device can be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which are stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media.

While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine, which instructions cause the machine to perform any one or more of the methodologies of the present disclosure. The term "machine-readable storage medium" shall accordingly be taken to include, but not be limited to, solid-state memories, optical media, and magnetic media.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate or subregions of the substrate may be controlled through doping using various chemical species including, but not limited to, phosphorus, boron, or arsenic. Doping may be performed during the initial formation or growth of the substrate, by ion implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "vertical," "lateral," "upper," "lower," "above," and "below" can refer to relative directions or positions of features in the semiconductor devices in view of the orientation shown in the figures. For example, "upper" or "uppermost" can refer to a feature positioned closer to the top of a page than another feature. These terms, however, should be construed broadly to include semiconductor devices having other orientations, such as inverted or inclined orientations where top/bottom, over/under, above/below, up/down, and left/right can be interchanged depending on the orientation.

It should be noted that the methods described above describe possible implementations, that the operations and the steps may be rearranged or otherwise modified, and that other implementations are possible. Furthermore, embodiments from two or more of the methods may be combined.

From the foregoing, it will be appreciated that specific embodiments of the invention have been described herein for purposes of illustration but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods, in addition to those specific embodiments disclosed herein, may be within the scope of the present technology.

I claim:

1. A memory device comprising:
a memory array;
a sideband bus interface coupled to a sideband bus, the sideband bus interface comprising:
an upstream data terminal coupled to an upstream data line; and
a downstream data terminal coupled to a downstream data line, wherein the upstream data line is initially uncoupled communicatively from the downstream data line; and
a topology-based dynamic address assignment (DAA) circuit coupled to the sideband bus interface, wherein the topology-based DAA circuit is configured to:
determine whether the memory device has been assigned an address; and
couple the upstream data line to the downstream data line when the memory device has been assigned the address, the upstream and downstream data lines coupled for allowing a message to flow across the downstream and upstream data lines regardless of a content of the message.

2. The memory device of claim 1, the memory device further comprising a dynamic address valid register, wherein the determination of whether the memory device has been assigned an address is based on a value of the dynamic address valid register.

3. The memory device of claim 1, wherein the topology-based DAA circuit is further configured to drive a static value on the downstream data line when the memory device has not been assigned an address.

4. The memory device of claim 3, wherein the static value is a logical high value.

5. The memory device of claim 1, wherein the address identifies the memory device on the sideband bus.

6. The memory device of claim 1, wherein the topology-based DAA circuit comprises a transmission gate coupled to the upstream data line and the downstream data line, and wherein coupling the upstream data line to the downstream data line comprises enabling the transmission gate.

7. The memory device of claim 1, wherein the topology-based DAA circuit is further configured to:
receive an enter DAA command over the upstream data line; and
based on determining that the memory device has not been assigned an address, performing a DAA process in response to receiving the enter DAA command, the DAA process comprising:
transmitting device information, associated with the memory device, over the upstream data line;
receiving a dynamic address over the upstream data line; and
maintaining the dynamic address as the address assigned to the memory device.

8. The memory device of claim 1, wherein the downstream data line is coupled to an upstream data terminal of a second memory device.

9. The memory device of claim 1, wherein the upstream data line is coupled to a data terminal of a bus controller.

10. The memory device of claim 1, wherein the sideband bus complies with a portion of an Improved Inter Integrated Circuit (I3C) specification.

11. The memory device of claim 1 wherein the memory device comprises a dynamic random access memory (DRAM) device, the memory device further comprising a mode register, wherein the mode register characterizes an aspect of the memory array, and wherein the memory device is configured to transmit a value from the mode register over the sideband bus.

12. A memory module comprising:
a first memory device, the first memory device comprising a first clock terminal, a first upstream data terminal, and a first downstream data terminal;

a second memory device, the second memory device comprising a second clock terminal, a second upstream data terminal, and a second downstream data terminal;

a clock line coupled to the first clock terminal and the second clock terminal;

a first data line segment coupled to the first upstream data terminal; and a second data line segment coupled to the first downstream data terminal and the second upstream data terminal;

wherein, prior to an address being assigned to the first memory device, the first upstream data terminal is initially uncoupled from the first downstream data terminal; and wherein, when the first memory device has been assigned the address, the first memory device is configured to couple the first upstream data terminal to the first downstream data terminal for allowing a message to flow across the first upstream data terminal and the first downstream data terminal regardless of a content of the message.

13. The memory module of claim 12, wherein the first data line segment is coupled to a data terminal of a bus controller.

14. The memory module of claim 13, wherein the bus controller is a memory controller.

15. The memory module of claim 12, wherein the first memory device comprises a topology-based DAA circuit, the topology-based DAA circuit configured to couple the first upstream data terminal to the first downstream data terminal when the first memory device is associated with an assigned address.

16. The memory module of claim 15, wherein the topology-based DAA circuit is further configured to drive a static value on the second data line segment when the first memory device is not associated with an assigned address.

17. The memory module of claim 12, the memory module further comprising a sideband bus comprised of the clock line, the first data line segment, and the second data line segment.

18. The memory module of claim 17, the memory module further comprising a temperature sensor coupled to a second sideband bus.

19. A method comprising:

transmitting, by a bus controller coupled to a bus, an enter DAA command over the bus;

receiving, over the bus, device information from a memory device coupled to the bus;

maintaining an upstream data terminal of the memory device uncoupled from a downstream data terminal of the memory device until the memory device receives a dynamic address;

generating, by the bus controller, the dynamic address;

associating the dynamic address with the received device information;

transmitting, over the bus, the dynamic address to the memory device;

coupling, after the memory device receives the dynamic address, the upstream data terminal to the downstream data terminal to allow the dynamic address to flow across the upstream data terminal and the downstream data terminal regardless of a content of the dynamic address; and transmitting, over the bus, the enter DAA command.

20. The method of claim 19, wherein the generated dynamic address is a next sequential address of a previously generated dynamic address.

* * * * *